L. BEDARD, Jr. & S. BOITEAU, Jr.
ANIMAL TRAP.
APPLICATION FILED JUNE 9, 1916.
1,256,973.
Patented Feb. 19, 1918.
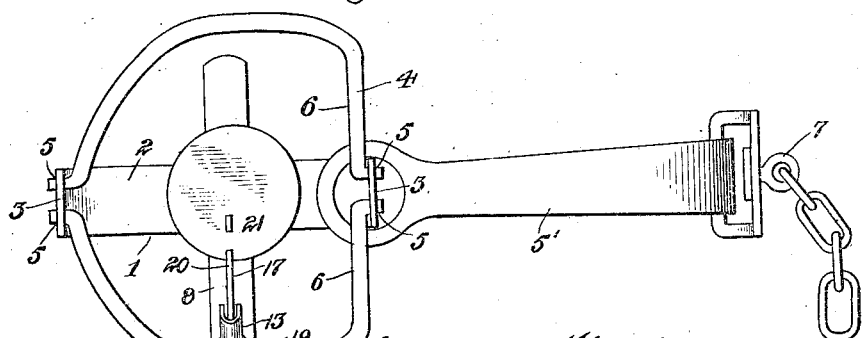
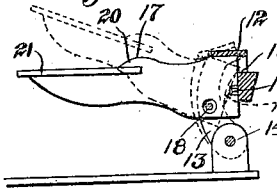
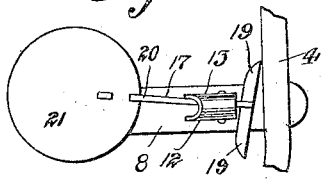
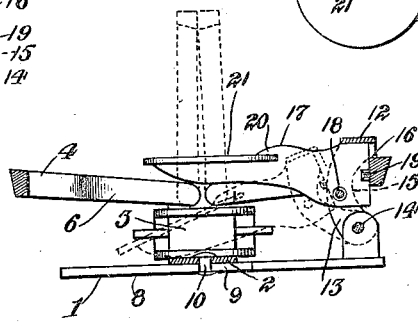
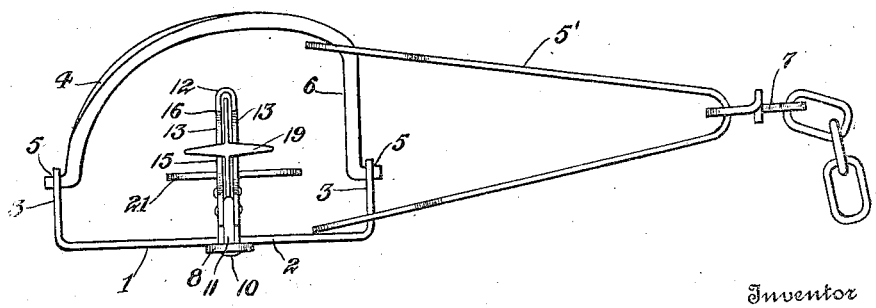
Inventor
Leon Bedard Jr.
Simeon Boiteau Jr.
Witnesses
By Victor J. Evans
Attorney

UNITED STATES PATENT OFFICE.

LEON BEDARD, JR., AND SIMEON BOITEAU, JR., OF ST. SAUVEUR, QUEBEC, CANADA.

ANIMAL-TRAP.

1,256,973.  Specification of Letters Patent.  Patented Feb. 19, 1918.

Application filed June 9, 1916. Serial No. 102,784.

*To all whom it may concern:*

Be it known that we, LEON BEDARD, Jr., and SIMEON BOITEAU, Jr., subjects of the King of Great Britain, residing at St. Sauveur, in the Province of Quebec and Dominion of Canada, have invented new and useful Improvements in Animal-Traps, of which the following is a specification.

This invention is an improved animal trap of that class in which a pair of jaws are held open by a keeper, are released from the keeper by a trigger which has a pan or disk on its lever arm to be stepped on or moved by the animal and are then closed by a spring so as to catch the animal by the leg, the object of the invention being to provide an improved trap of this kind embodying a keeper which comprises a pivotally mounted link and also embodying a trigger of novel and improved construction which is pivotally mounted in the keeper link and which serves to release the jaws when the trigger is stepped on or moved in any direction by the animal, thus insuring the catching of the animal under all conditions.

The invention consists in the features of construction, combination, and arrangement of devices, hereinafter fully described and claimed.

In the accompanying drawings:—

Figure 1 is a plan of our improved trap, showing the same set.

Fig. 2 is a transverse sectional view of the same, showing the same with its parts in set position, in full lines, and in released or sprung position in dotted lines.

Fig. 3 is a side elevation of the same.

Fig. 4 is a detail view.

Fig. 5 is a detail plan showing the disk moved sidewise and showing one of the transversely arranged arms in the act of disengaging the keeper link from one of the jaws.

The base 1 comprises a bar 2 and vertical arms 3 which extend upwardly from the ends of the bar. A pair of jaws 4 are pivotally mounted as at 5 in the arms 3. These jaws are adapted to be closed by a substantially U-shaped spring 5', one arm of which has an eye or opening through which one of the arms 3 extend, the upper arm of the spring having an eye or opening at its free end, which is movable vertically on the straight inner sides 6 of the jaw. A chain may be connected to the spring by means of a suitable clip 7 as here shown.

A cross bar 8 is arranged under the bar 2 and has a slot 9 in its central portion, through which passes a rivet 10 which secures the cross bar to the bar of the base.

At one end of the cross bar is an upwardly extending lug 11. A keeper link 12 which is of substantially inverted U-shape, and the arms 13 of which are substantially semicircular, has the lower ends of its arms arranged on opposite sides of the lug and pivotally connected thereto by a suitable pin 14. The arms of the keeper link are recessed in their outer sides as at 15 to receive one of the jaws of the trap, and to provide shoulders 16 to bear on said jaws and hence hold the jaws in open position when the trap is set.

A trigger 17 is loosely pivotally mounted between the arms of the keeper link, as at 18 and is arranged to bear at its outer end against said jaw and is also provided at its outer end with a pair of oppositely extending, transversely arranged arms 19 to also bear against the inner side of said jaw. The lever arm 20 of the trigger, which extends inwardly above the center of the base, is provided with a pan or disk 21.

When an animal steps upon the pan or disk, the lever arm of the trigger causes the latter by the engagement of its arms 19 with the outer side of the arms of the link, to turn the link inwardly and downwardly so that its shoulders 16 slip from and disengage the jaw, whereupon the springs close the jaws in the usual manner. It will be noted that the arms 19 of the trigger serve to disengage the keeper link from the arm and spring the trap in the event that the animal should not step upon the pan or disk, but should move the lever arm of the trigger by its head or by one of its paws, so that the trap is sure to catch the animal when the trap is disturbed by the animal in any way, either by stepping on the pan or moving the same sidewise in any direction.

Having described the invention, what is claimed is:

1. In a trap of the class described, in combination with a base, a pair of jaws, and a spring to close the jaws, a keeper link pivotally connected to the base, recessed in its outer side to receive and provided with a shoulder to engage on the upper side of one of the jaws, and a trigger pivotally mounted between the arms of the keeper link, so that said trigger can be moved either vertically or horizontally, said trigger being arranged to bear at its outer end against one side of said jaw, and also having a stop to engage the outer side of the keeper link and cause the latter to be turned inwardly and downwardly on its pivot to disengage its shoulder from said jaw, when the lever arm of the trigger is moved in any direction.

2. In combination with the base, pivoted jaws and jaw closing springs of a trap of the class described, said base having an element provided with an upwardly extending lug, a substantially inverted U-shaped keeper link having its arms arranged on opposite sides of and their lower ends pivotally connected to said lugs, said arms of the keeper link also having recesses in their outer sides to receive one of the jaws and shoulders to bear on said jaw, and a trigger pivotally mounted between the arms of the keeper link so that said trigger can be moved either vertically or horizontally and having an inwardly extending arm, said trigger being constructed at its outer end to bear against said jaw when the trap is set and being also provided at its outer end with oppositely extending stop arms to bear against said jaw at corresponding points, and to also engage and turn the keeper link downwardly to release the jaw when the arm of the trigger is moved in any direction.

In testimony whereof we affix our signatures in presence of two witnesses.

LEON BEDARD, Jr.
SIMEON BOITEAU, Jr.

Witnesses:
J. E. GAUVIN,
EUDON BILODEAU.